United States Patent
Araki

(10) Patent No.: US 7,376,054 B2
(45) Date of Patent: May 20, 2008

(54) DISC REPRODUCTION DEVICE

(75) Inventor: Takako Araki, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 10/523,519

(22) PCT Filed: Jul. 25, 2003

(86) PCT No.: PCT/JP03/09506

§ 371 (c)(1),
(2), (4) Date: Feb. 4, 2005

(87) PCT Pub. No.: WO2004/013849

PCT Pub. Date: Feb. 12, 2004

(65) Prior Publication Data

US 2005/0254362 A1   Nov. 17, 2005

(30) Foreign Application Priority Data

Aug. 6, 2002   (JP) ............................. 2002-228978

(51) Int. Cl.
*G11B 7/00* (2006.01)
(52) U.S. Cl. .............................. 369/44.27; 369/44.32; 369/44.34
(58) Field of Classification Search ............. 369/44.32, 369/44.27, 44.34
See application file for complete search history.

(56) References Cited

U.S. PATENT DOCUMENTS 5,090,003 A     2/1992  Watanabe et al.
5,251,194 A *  10/1993  Yoshimoto et al. ...... 369/44.26
5,343,454 A *   8/1994  Watanabe et al. ........ 369/44.32
5,808,983 A *   9/1998  Tsutsui et al. ........... 369/44.29
6,028,826 A *   2/2000  Yamamoto et al. ...... 369/44.35
6,252,835 B1 *  6/2001  Choi ....................... 369/44.29
6,487,146 B1 * 11/2002  Verboom .................. 369/44.25
2003/0202437 A1* 10/2003 Yamada et al. .......... 369/44.29
2004/0027947 A1*  2/2004 Asano et al. ............. 369/47.31

FOREIGN PATENT DOCUMENTS

JP       2-246024      10/1990
JP       3-178043      8/1991
JP      11-53744       2/1999
JP    2003-173546      6/2003

* cited by examiner

*Primary Examiner*—Wayne Young
*Assistant Examiner*—Linh T. Nguyen
(74) *Attorney, Agent, or Firm*—Kratz, Quintos & Hanson, LLP

(57) ABSTRACT

The present invention provides a disk playback device comprising a control circuit 7 for determining an optimum value of offset for a focus error signal based on amplitude values of a tracking error signal or an RF signal fed from an optical head 5, and making an offset adjustment with reference to the optimum value. The control circuit 7, in signal reproduction, approximates the relationship between offset values and the amplitude values to a quadratic curve with reference to three different offset values and three amplitudes at the respective offset values, repeats a calculation of an optimum offset value corresponding to the peak of the quadratic curve, and sets the three different first to third offset values respectively at an optimum value obtained in a previous optimum offset value calculation processing, and second and third offset values set in the previous optimum offset value calculation processing.

3 Claims, 18 Drawing Sheets

DISC REPRODUCTION DEVICE

TECHNICAL FIELD

The present invention relates to disk playback devices for reproducing signals from a disk by irradiating the disk with a laser beam from an optical head.

BACKGROUND ART

For use as recording media in disk recording-playback devices, magneto-optical disks have been developed which permit rewriting and have a great memory capacity and high reliability. Such disks have found wide use as external memories in computers and audio visual devices.

Developed especially in recent years are techniques for achieving improved recording densities by forming lands 11 and grooves 12 alternately on a signal bearing surface of a magneto-optical disk 1 as shown in FIG. 12 and recording signals on both the lands 11 and the grooves 12. The lands 11 and the grooves 12 are wobbled as illustrated, and the wobbling frequency is a predetermined center frequency as frequency-modulated. A wobble signal is detected by signal reproduction, and the rotation of the magneto-optical disk is so adjusted that the wobble signal has the center frequency at all times, whereby constant linear velocity control is realized. Various items of information (wobble information) such as address information are contained in the wobble signal which is frequency-modulated as stated above. Various control operations are realized based on the wobble information at the time of signal reproduction.

When disk recording-playback devices are in operation for reproducing or recording signals, focus servo or tracking servo is performed for the actuator incorporated in the optical head, based on focus error (FE) signals and tracking error (TE) signals. When the disk recording-playback device is initiated into operation, an offset adjustment is made for focusing or tracking based on the TE signals and RF signals to thereby effect accurate focus servo and tracking servo.

In a process for determining an optimum offset value for a focus error based on the TE signal, as seen in FIG. 19, first, focus offset values are respectively set at at least five different values $P_0$ to $P_4$ centered about an initial value $P_0$, and amplitude values of the TE signal at the respective offset values are measured. Among said at least five points measured, a first point is set at a point having the maximum amplitude value, a second point is set at a point having an offset value smaller than the offset value $P_0$ at the first point and an amplitude value not greater than a value $(T_0-5)$ obtained by subtracting a predetermined value from an amplitude value $T_0$ at the first point, a third point is set at a point having an offset value greater than the offset value $P_0$ at the first point and an amplitude value not greater than the value $(T_0-5)$ obtained by subtracting the predetermined value from the amplitude value $T_0$ at the first point. With reference to the offset values $P_0$, $P_1$, $P_4$ and the amplitude values $T_0$, $T_1$, $T_4$ at the respective three points, a quadratic curve representing the relationship between the offset values and the amplitude values is determined. An offset value corresponding to the peak of the quadratic curve is determined as an optimum offset value $P_{opt1}$. A procedure for determining an optimum offset value based on the RF signals is the same as the above.

FIGS. 13 to 15 show a focus offset adjustment procedure to be executed based on the TE signals when the disk recording-playback device is into an initiation operation. First in steps S91 to S94 in FIG. 13, focus offset values are respectively set at an initial value $P_0$, a value $P_1$ smaller than the initial value by eight steps, a value $P_2$ smaller than the initial value by four steps, a value $P_3$ greater than the initial value by four steps, and a value $P_4$ greater than the initial value by eight steps, and amplitude values $T_0$ to $T_4$ are measured at the respective offset values. Among these five points measured, thereafter, a first point is set at a point having the maximum amplitude value. A first offset value $P_{max}$ is set at an offset value at the first point. A first amplitude value $T_{max}$ is set at an amplitude value at the first point.

Subsequently in step S95, an inquiry is made as to whether a second point having an offset value $P_x$ smaller than the first offset value $P_{max}$ and an amplitude value $T_x$ smaller than the first amplitude value $T_{max}$ by five steps or more is included in four measured points other than the first point. If the inquiry is answered in the affirmative, step S96 follows to set a second offset value $P_A$ at the offset value $P_x$ at the second point, set a second amplitude value $T_A$ at the amplitude value $T_x$ at the second point, and set to "TRUE" a $P_A$_flag indicating whether the second offset value $P_A$ is obtained, thereafter followed by step S97.

In step S97, an inquiry is made as to whether a third point having an offset value PX greater than the first offset value $P_{max}$ and an amplitude value $T_x$ smaller than the first amplitude value $T_{max}$ by five steps or more is included in the four measured points other than the first point. If the inquiry is answered in the affirmative, step S98 follows to set a third offset value $P_B$ at the offset value $P_x$ at the third point, set a third amplitude value $T_B$ at the amplitude value $T_x$ at the third point, and set to "TRUE" a $P_B$_flag indicating whether the third offset value $P_B$ is obtained, thereafter followed by step S99 shown in FIG. 14.

When the second point and the third point are both included in the four measured points other than the first point, answers to inquiries in step S99 in FIG. 14 and in step S106 in FIG. 15 are affirmative, followed by step S113. With reference to data on the first to third points ($P_{max}$, $T_{max}$), ($P_A$, $T_A$) and ($P_B$, $T_B$) which are included in the five measured points, the relationship between the offset values and the amplitude values is approximated to a quadratic curve, and an offset value corresponding to the peak of the quadratic curve is calculated as an optimum offset value $P_{opt}$, to terminate the procedure.

On the other hand, when the second point is not included in the four measured points other than the first point, an answer to the inquiry in step S99 in FIG. 14 is negative. In steps S100 to S105, an offset value P is decreased every four step starting from a value smaller than the initial value $P_0$ by 12 steps, to thereby vary the offset value until when the amplitude value T becomes a value smaller than the first amplitude value $T_{max}$ by five steps or more. Then the offset value and amplitude value concerned are respectively set at a second offset value $P_A$ and a second amplitude value $T_A$. Accordingly the second point is retrieved. When, in step S113 in FIG. 15, the relationship between the offset values and the amplitude values is approximated to a quadratic curve, the data ($P_A$, $T_A$) at the retrieved second point is used. Incidentally, in retrieving the second point, in the case where the offset value P is smaller than the initial value $P_0$ by 20 steps or more to make the answer to step S101 affirmative, or in the case where the amplitude value T is not greater than a lower limit value $T_L$ to make the answer to step S103 affirmative, focus servo deviates to terminate the procedure.

Furthermore, when the third point is not included in the four measured points other than the first point, an answer to the inquiry in step S106 in FIG. 15 is negative. In steps S107 to S112, an offset value P is increased every four step starting from a value greater than the initial value $P_0$ by 12 steps, to thereby vary the offset value until when the amplitude value T becomes a value smaller than the first amplitude value $T_{max}$ by five steps or more. Then the offset value and amplitude value concerned are respectively set at a third offset value $P_B$ and a third amplitude value $T_B$. Accordingly the third point is retrieved. When, in step S113, the relationship between the offset values and the amplitude values is approximated to a quadratic curve, the data ($P_B$, $T_B$) at the retrieved third point is used. Incidentally, in retrieving the third point, in the case where the offset value P is greater than the initial value $P_0$ by 20 steps or more to make the answer to step S108 affirmative, or in the case where the amplitude value T is not greater than a lower limit value $T_L$ to make the answer to step S110 affirmative, focus servo deviates to terminate the procedure.

According to the above procedure, the optimum offset value $P_{opt}$ for the focus error is determined based on the TE signals, and an offset adjustment for focusing is made based on the optimum offset value $P_{opt}$. According to the same procedure, an optimum offset value for the focus error is determined based on the RF signals, and an offset adjustment for focusing is made based on the optimum offset value. The disk recording-playback device starts signal reproduction or signal recording after the offset adjustment for focusing thus made.

In a usual operation for signal reproduction or signal recording, variations in the ambient temperature, however, lead to the distortion of the housing or parts of the optical head, a shift of position of the optical sensor, variations in the laser wavelength, etc., altering the offset value from an optimum value and consequently impairing the accuracy of focus servo. If the offset value deviates from the optimum value greatly, the bit error rate of reproduced signal exceeds a prescribed value, presenting difficulty in effecting normal reproduction and recording.

In the usual operation, an offset adjustment for focusing is made every time a temperature of the disk varies by a predetermined temperature or more.

In a process of determining an optimum offset value for a focus error based on the TE signals for the usual operation, as seen in FIG. 20, first, focus offset values are respectively set at at least five different values $P_{opt1}$, $P_1'$ to $P_4'$, centered about the optimum offset value $P_{opt1}$, i.e., the set value concerned, determined in a previous offset adjustment processing, and amplitude values of the TE signals at the respective offset values are measured. Among said at least five points measured, a first point is set at a point having the maximum amplitude value, a second point is set at a point having an offset value smaller than the offset value $P_{opt1}$ at the first point and an amplitude value not greater than a value ($T_{opt1}$−5) obtained by subtracting a predetermined value from an amplitude value $T_{opt1}$ at the first point, a third point is set at a point having an offset value greater than the offset value $P_{opt1}$ at the first point and an amplitude value not greater than the value ($T_{opt1}$−5) obtained by subtracting the predetermined value from the amplitude value $T_{opt1}$ at the first point. With reference to the offset values $P_{opt1}$, $P_1'$, $P_4'$ and the amplitude values $T_{opt1}$, $T_1'$, $T_4'$ at the respective three points, a quadratic curve representing the relationship between the offset values and the amplitude values is determined. An offset value corresponding to the peak of the quadratic curve is determined as an optimum offset value $P_{opt2}$. A procedure of determining an optimum offset value based on the RF signals is the same as the above.

FIGS. 16 to 18 show a focus offset adjustment procedure to be executed based on the TE signals when temperature variations in excess of or equal to a predetermined value (=5° C.) occur in a usual operation after the system's initiation into operation. First in steps S121 to S124, focus offset values are respectively set at a set value concerned $P_0'$, a value $P_1'$ smaller than the set value by eight steps, a value $P_2'$ smaller than the set value by four steps, a value $P_3'$ greater than the set value by four steps, and a value $P_4'$ greater than the set value by eight steps, and amplitude values $T_0'$ to $T_4'$ are measured at the respective offset values. Among these five points measured, thereafter, the maximum amplitude value is a first point. An offset value at the first point is a first offset value $P_{max}'$. An amplitude value at the first point is a first amplitude value $T_{max}'$.

Subsequently in step S125, an inquiry is made as to whether a second point having an offset value $P_x'$ smaller than the first offset value $P_{max}'$ and an amplitude value $T_x'$ smaller than the first amplitude value $T_{max}'$ by five steps or more is included in four measured points other than the first point. If the inquiry is answered in the affirmative, step S126 follows to set a second offset value $P_A$ at the offset value $P_x'$ at the second point, set a second amplitude value $T_A$ at the amplitude value $T_x'$ at the second point, and set to "TRUE" a $P_A$ flag indicating whether the second offset value $P_A$ is obtained, thereafter followed by step S127.

In step S127, an inquiry is made as to whether a third point having an offset value $P_x'$ greater than the first offset value $P_{max}'$ and an amplitude value $T_x'$ smaller than the first amplitude value $T_{max}'$ by five steps or more is included in the four measured points other than the first point. If the inquiry is answered in the affirmative, step S128 follows to set a third offset value $P_B$ at the offset value $P_x'$ at the third point, set a third amplitude value $T_B$ at the amplitude value $T_x'$ at the third point, and set to "TRUE" a $P_B$ flag indicating whether the third offset value $P_B$ is obtained, thereafter followed by step S129 shown in FIG. 17.

When the second point and the third point are included in the four measured points other than the first point, answers to inquiries in step S129 in FIG. 17 and in step S136 in FIG. 18 are affirmative, followed by step S143. With reference to data on the first to third points ($P_{max}'$, $T_{max}'$), ($P_A$, $T_A$) and ($P_B$, $T_B$) which are included in the five measured points, the relationship between the offset values and the amplitude values is approximated to a quadratic curve, and an offset value corresponding to the peak of the quadratic curve is calculated as an optimum offset value $P_{opt}'$, to terminate the procedure.

On the other hand, when the second point is not included in the four measured points other than the first point, a second point is retrieved according to the same procedure as that in an initiation operation as shown in steps S130 to S135 in FIG. 17. When, in step S143 in FIG. 18, the relationship between the offset values and the amplitude values is approximated to a quadratic curve, data ($P_A$, $T_A$) at the retrieved second point is used.

Furthermore, when the third point is not included in the four measured points other than the first point, a third point is retrieved according to the same procedure as that in an initiation operation as shown in steps S137 to S142 in FIG. 18. When, in step S143, the relationship between the offset values and the amplitude values is approximated to a quadratic curve, data ($P_B$, $T_B$) at the retrieved third point is used.

According to the above procedure, the optimum offset value $P_{opt}'$ for a focus error is determined based on the TE signals, and the focus offset adjustment is made based on the optimum offset value $P_{opt}'$. According to the same procedure, an optimum offset value for a focus error is determined based on the RF signals, and the focus offset adjustment is made based on the optimum offset value. The disk recording-playback device starts signal reproduction or signal recording after the offset adjustment for focusing thus made. When the disk recording-playback device is in the usual operation, the focus offset adjustment is thus made, consequently effecting focus servo with high accuracy at all times despite variations in temperature of the magneto-optical disk.

However, the disk recording-playback device described has the following problem: in the offset adjustment procedure of the usual operation, the relationship between the offset values and the amplitude values is approximated to a quadratic curve with reference to the previous optimum offset value $P_{opt1}$, and the second and third offset values $P_1'$, $P_4'$ each having an amplitude value smaller than the amplitude value $T_{opt1}$ at the offset value $P_{opt1}$ by a predetermined value or more, as shown in FIG. 20, to increase accuracy of the quadratic curve. For obtaining the second and third offset values $P_1'$, $P_4'$, amplitude values at at least five different offset values $P_{opt1}$ and $P_1'$ to $P_4'$ need be measured, requiring a long period of time for determining the quadratic curve, thereby entailing the problem of a long period of time taken for the calculation of the optimum offset value.

An object of the present invention is to provide a disk playback device which is adapted to determine the optimum offset value for the error signal in a short period of time when in the usual operation.

DISCLOSURE OF THE INVENTION

The present invention provides a disk playback device comprising a calculation processing circuit for determining an optimum value of offset for an error signal based on an amplitude value of the error signal in accordance with focus deviation or tracking deviation of an optical head, or an amplitude value of an output signal of the optical head, and making an offset adjustment based on the optimum offset value. The calculation processing circuit approximates to a quadratic curve the relationship between offset values and the amplitude values in signal reproduction, and repeats calculation of the optimum offset values based on the quadratic curve. The calculation processing circuit comprises:

calculation processing means for approximating to a quadratic curve the relationship between the offset values and the amplitude values with reference to three different offset values and three amplitude values at the respective offset values, and calculating an offset value corresponding to the peak of the quadratic curve as the optimum offset value, and value setting means for setting the three different offset values: a first offset value; a second offset value smaller than the first offset value and having an amplitude value smaller than an amplitude value at the first offset value by a predetermined value or more; a third offset value greater than the first offset value and having an amplitude value smaller than an amplitude value at the first offset value by a predetermined value or more, and setting the three amplitude values respectively at three amplitude values at the first to third offset values. The value setting means sets the first offset value at an optimum offset value obtained in a previous optimum offset value calculation processing, and sets the second and third offset values respectively at second and third offset values set in a previous optimum offset value calculation processing.

According to an optimum offset value calculation processing in a usual reproduction operation of the present invention, the first offset value is set at an optimum offset value obtained in a previous optimum offset value calculation processing, and the second and third offset values are respectively set at second and third offset values set in a previous optimum offset value calculation processing.

Incidentally, the second and third offset values set in the previous optimum offset value calculation processing each has an amplitude value smaller than an amplitude value at the first offset value by a predetermined value or more. Further, the offset value corresponding to the peak of the quadratic curve is calculated as the optimum offset value, so that the optimum offset value obtained in the previous optimum offset value calculation processing has an amplitude value greater than the amplitude value at the first offset value. Accordingly, the second and the third offset values each has an amplitude value smaller than the amplitude value at the optimum offset value by a predetermined value or more.

Furthermore, when the disk playback device is in a usual reproduction operation, the quadratic curve representing the relationship between the offset values and the amplitude values shows little change. Therefore, also in the current offset value calculation processing, the amplitude values at the previous second and third offset values have a very high possibility of being smaller than the amplitude value at the previous optimum offset value by a predetermined value or more, whereby the quadratic curve can be determined with high accuracy with reference to the previous optimum offset value, the second and third offset values, and the amplitude values at the respective offset values.

According to the optimum offset value calculation processing of the present invention, if the amplitude values at at least three offset values, i.e., the previous optimum offset value, the previous second and third offset values, are measured, the quadratic curve can be determined with high accuracy with reference to these three offset values and three amplitude values. Thus a period of time required for the determination of the quadratic curve is made shorter than conventionally, because, with the conventional device, the measurement of amplitude values at at least five different offset values is required. This makes shorter a period of time taken for the calculation of the optimum offset value.

Stated specifically, the calculation processing circuit comprises:

first checking means for checking whether an amplitude value at the previous second offset value is smaller than an amplitude value at the previous optimum offset value by a predetermined value or more, second checking means for checking whether an amplitude value at the previous third offset value is smaller than an amplitude value at the previous optimum offset value by a predetermined value or more, the value setting means comprising:

second offset value setting means for retrieving an offset value having an amplitude value smaller than the amplitude value at the previous optimum offset value by a predetermined value or more when the amplitude value at the previous second offset value is not found to be smaller than the amplitude value at the previous optimum offset value by a predetermined value or more, and setting a second offset value at the retrieved offset value, and third offset value setting means for retrieving an offset value having an amplitude value smaller than the amplitude value at the previous optimum offset value by a predetermined value or more when the amplitude value at the previous third offset value is not found to be smaller than the amplitude value at the previous optimum offset value by a predetermined value or more, and setting a third offset value at the retrieved offset value.

As described above, also in the current offset value calculation processing, the amplitude values at the previous second and third offset values have a very high possibility of being smaller than the amplitude value at the previous optimum offset value by a predetermined value or more, but the amplitude values fail to be smaller than the value by a predetermined value or more as the case may be. In such a case, when the quadratic curve is determined with reference to the previous optimum offset value and the previous second and third offset values, the quadratic curve has a low accuracy, thereby impairing the accuracy of the optimum offset value corresponding to the peak of the quadratic curve.

According to the specific construction described, when the amplitude value at the previous second offset value is not found to be smaller than the amplitude value at the previous optimum offset value by a predetermined value or more, retrieved is an offset value having an amplitude value smaller than the amplitude value at the previous optimum offset value by a predetermined value or more, to determine a quadratic curve by setting a second offset value at the retrieved offset value. Furthermore, when the amplitude value at the previous third offset value is not found to be smaller than the amplitude value at the previous optimum offset value by a predetermined value or more, retrieved is an offset value having an amplitude value smaller than the amplitude value at the previous optimum offset value by a predetermined value or more, to determine a quadratic curve by setting a third offset value at the retrieved offset value. Accordingly, the quadratic curve can be determined with high accuracy, to thereby obtain the optimum offset value with high accuracy at all times.

Stated further specifically, the disk playback device comprises temperature detection means for detecting a temperature of the disk. The calculation processing circuit calculates the optimum offset value every time the disk is varied in temperature by a predetermined temperature value.

According to the specific construction described, every time the disk is varied in temperature by a predetermined temperature value, the optimum offset value is obtained. Based on the optimum offset value obtained, an offset adjustment is made. This reproduces an error signal given the optimum offset adjustment in accordance with temperature variations, whereby focusing of the optical head or tracking is controlled with high accuracy based on the error signal.

As described above, with the disk playback device of the present invention, the optimum value of offset for the error signals can be obtained in a short period of time when the device is in the usual operation.

BEST MODE OF CARRYING OUT THE INVENTION

With reference to the drawings, a detailed description will be given below of the present invention as embodied into disk recording-playback devices for use with magneto-optical disks serving as recording media.

Figure 1:
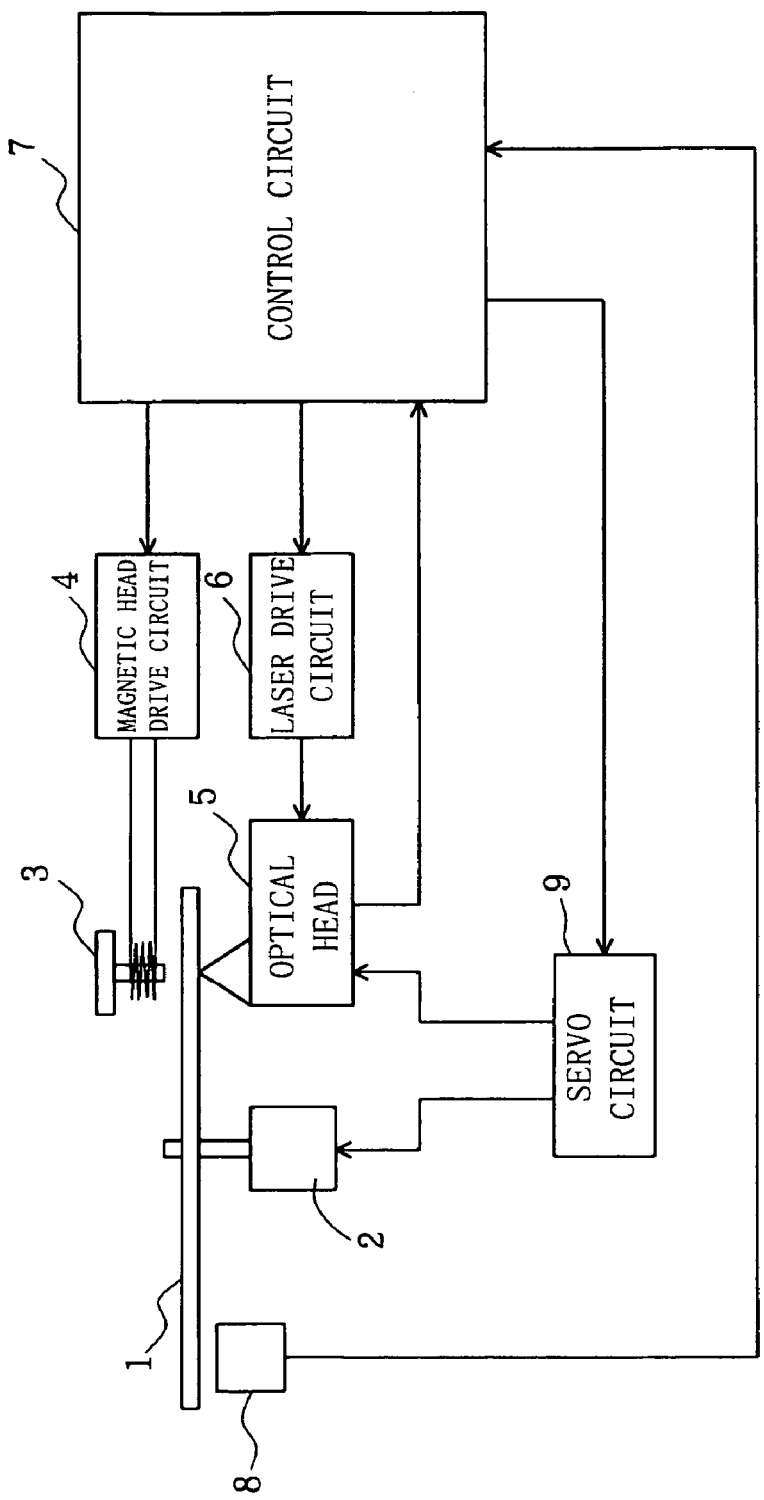
FIG. 1 is a block diagram showing a construction of a disk recording-playback device according to the present invention.

FIG. 1 shows a disk recording-playback device embodying the invention and comprising a spindle motor 2 for rotatingly driving a magneto-optical disk 1, a magnetic head 3 and an optical head 5 provided above and below the magneto-optical disk 1, respectively. A magnetic head drive circuit 4 is connected to the magnetic head 3 while a laser drive circuit 6 is connected to the optical head 5. Connected to the magnetic head drive circuit 4 and the laser drive circuit 6 is a control circuit 7, which controls recording/reproduction operations of signals. An output signal of the optical head 5 is fed to the control circuit 7, and output to a subsequent circuit as reproduced data after processing such as amplification, detection of reproduction signals, and error correction.

Further, a servo circuit 9 is connected to the spindle motor 2 and the optical head 5. An FE signal and a TE signal obtained from the output signal of the optical head 5 are fed to the servo circuit 9 from the control circuit 7. In response to the FE signal and TE signal, focus servo and tracking servo for an actuator (not shown) provided for the optical head 5 are executed. Furthermore, an external synchronizing signal is fed to the servo circuit 9 from the control circuit 7, and the rotation of the spindle motor 2 is controlled based on the signal.

Furthermore, provided opposed to the magneto-optical disk 1 is a temperature sensor 8 for measuring a temperature of the magneto-optical disk 1. An output terminal of the temperature sensor 8 is connected to the control circuit 7, where, based on temperature data obtained from the temperature sensor 8, an offset adjustment procedure as will be described below is executed, determining optimum offset values respectively for the FE signal and the TE signal, making the offset adjustment for the FE signal and the TE signal with reference to the respective optimum offset values. The FE signal and the TE signal given the offset adjustment are input to the servo circuit 9, and are fed to focus servo and tracking servo.

Figure 2:
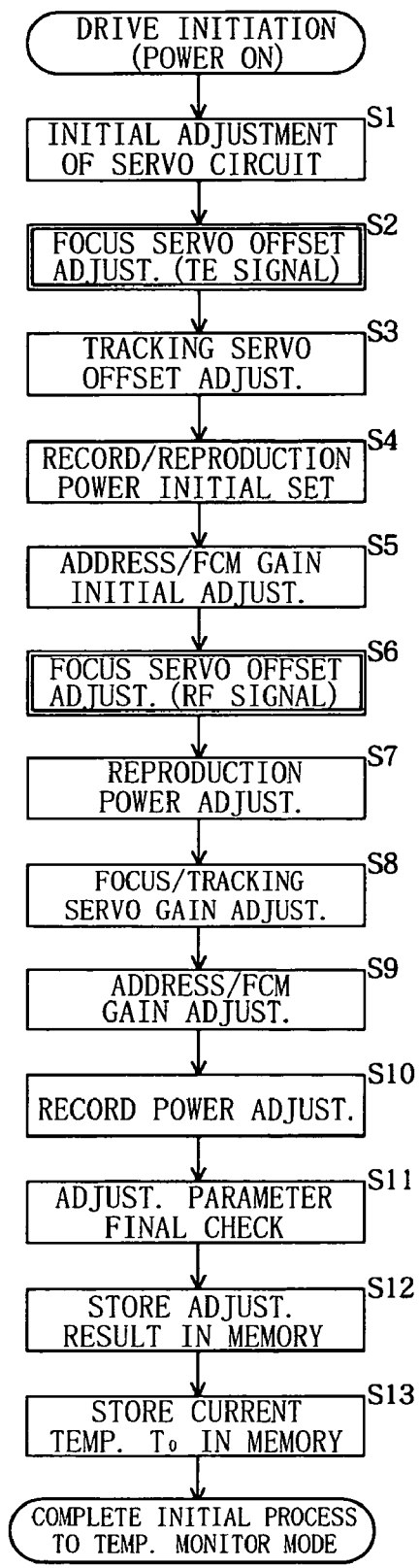
FIG. 2 is a flow chart showing a procedure to be executed when the disk recording-playback device is initiated into operation.

FIG. 2 shows a procedure to be executed by the control circuit 7 in an initiation into operation of the disk recording-playback device. When the device is turned on, first in step S1 various gains of the servo circuit 9 are set at initial values. In step S2 an offset value for focus is adjusted based on the TE signal.

Next in step S3 an offset value for tracking is adjusted based on the TE signal, and thereafter in step S4 each of a recording power and reproduction power is set at an initial value. Then in step S5 a gain necessary for reading out address information recorded on the magneto-optical disk (address gain) and a gain necessary for reading out an FCM (fine clock mark) (FCM gain) are set at initial values.

Subsequently in step S6 the offset value for focus is adjusted based on the RF signal, and thereafter in step S7 the reproduction power is adjusted. Then in step S8 a servo gain for focus and a servo gain for tracking are adjusted, and thereafter in step S9 the address gain and FCM gain are adjusted. A series of the adjustment processing of step S6 to step S9 is executed for each of the lands and grooves of the test tracks pre-provided on the magneto-optical disk.

Then in step S10 the recording power is adjusted for each of the lands and grooves of the test tracks. In step S11 current values of parameters adjusted as described are checked. Lastly in step S12 the current values of those parameters are stored in a built-in memory, and thereafter in step S13 a current disk temperature $T_0$ is stored in the built-in memory to terminate the procedure.

Figure 10:
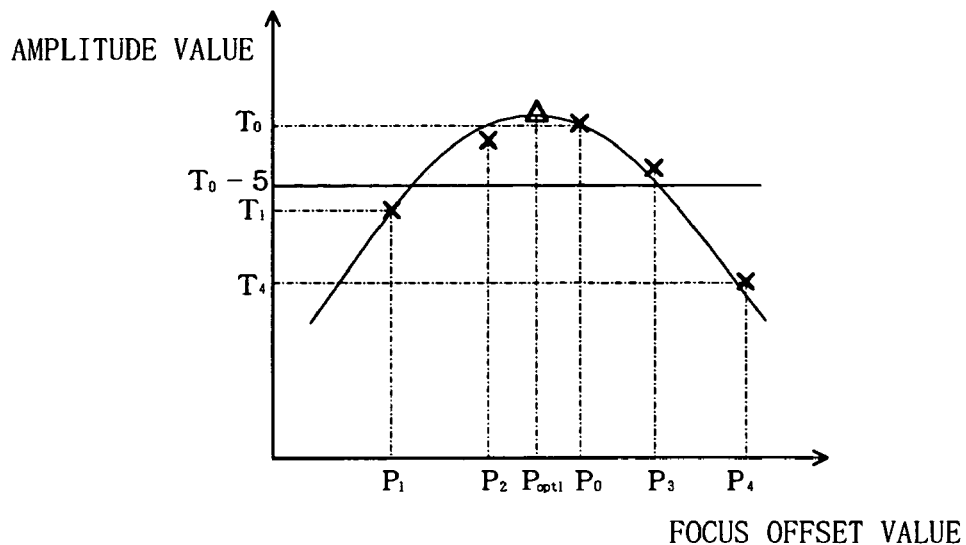
FIG. 10 is a graph illustrating the procedure of focus offset adjustment processing to be executed when the device is initiated into operation.

In the focus offset adjustment processing of step S2 and step S6 described, as seen in FIG. 10, focus offset values are respectively set at at least five different values $P_0$ to $P_4$ centered about an initial value $P_0$, and amplitude values of the TE signal or the RF signal at the respective offset values are measured. Among said at least five points measured, a first point is set at a point having the maximum amplitude value, a second point is set at a point having an offset value smaller than the offset value $P_0$ at the first point and an amplitude value not greater than a value $(T_0-5)$ obtained by subtracting a predetermined value from an amplitude value $T_0$ at the first point, a third point is set at a point having an offset value greater than the offset value $P_0$ at the first point and an amplitude value not greater than the value $(T_0-5)$ obtained by subtracting the predetermined value from the amplitude value $T_0$ at the first point. With reference to the offset values $P_0$, $P_1$, $P_4$ and the amplitude values $T_0$, $T_1$, $T_4$ at the respective three points, a quadratic curve representing the relationship between the offset values and the amplitude values is determined. An offset value corresponding to the peak of the quadratic curve is determined as an optimum offset value $P_{opt1}$. This procedure is the same as an offset adjustment processing to be executed when a conventional disk recording-playback device is initiated into operation.

Figure 3:
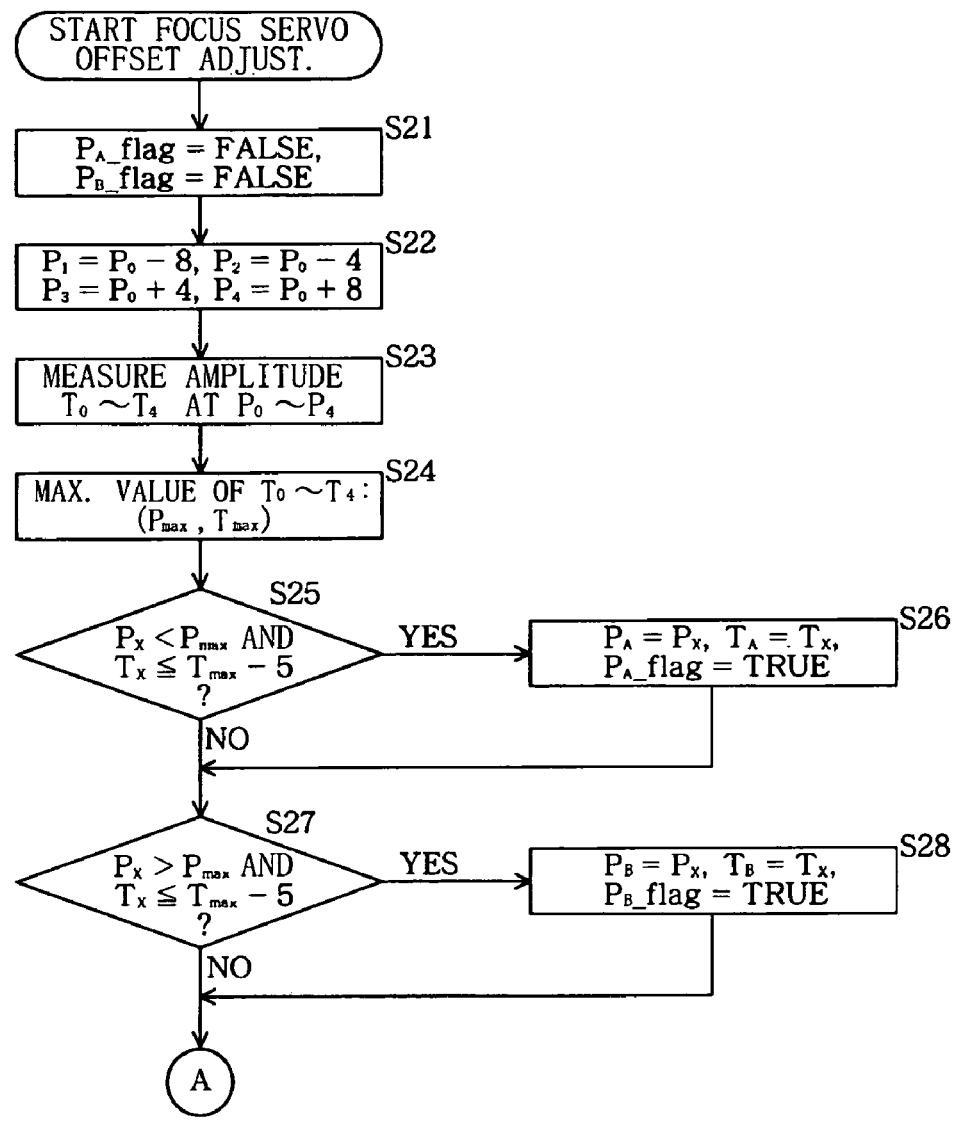
FIG. 3 is a flow chart showing a first part of a specific procedure of focus offset adjustment processing to be executed when the device is initiated into operation.
Figure 4:
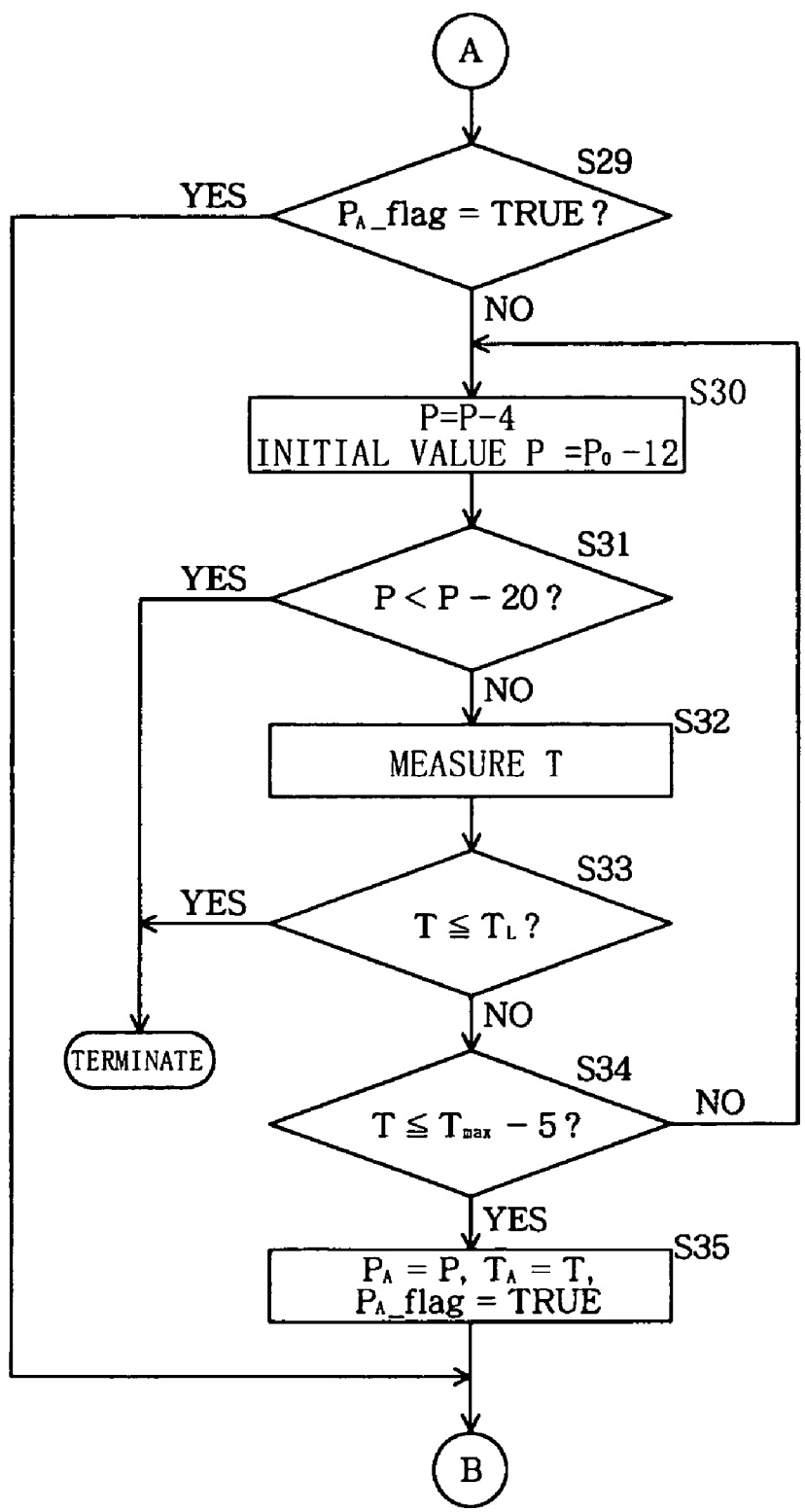
FIG. 4 is a flow chart showing a second part of the procedure.
Figure 5:
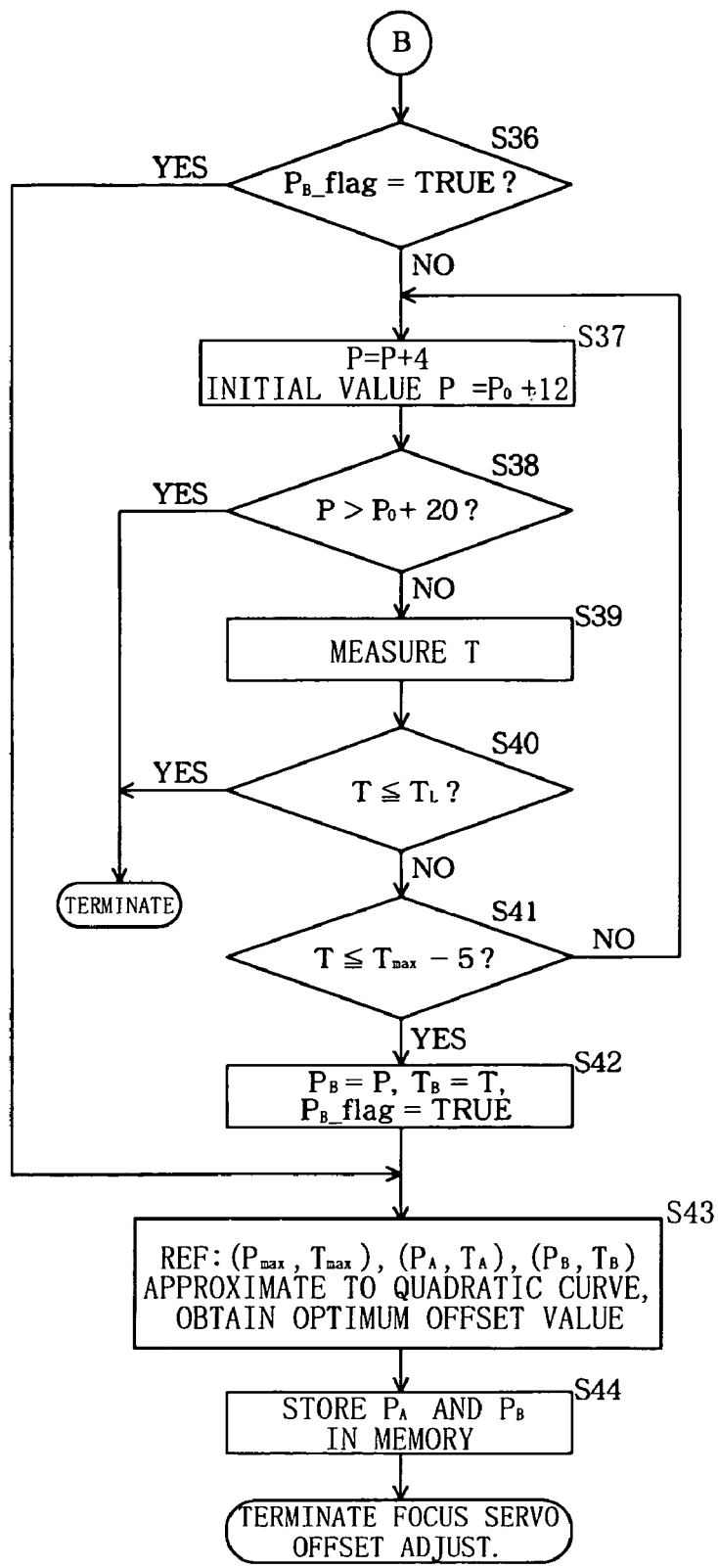
FIG. 5 is a flow chart showing a third part of the procedure.
Figure 13:
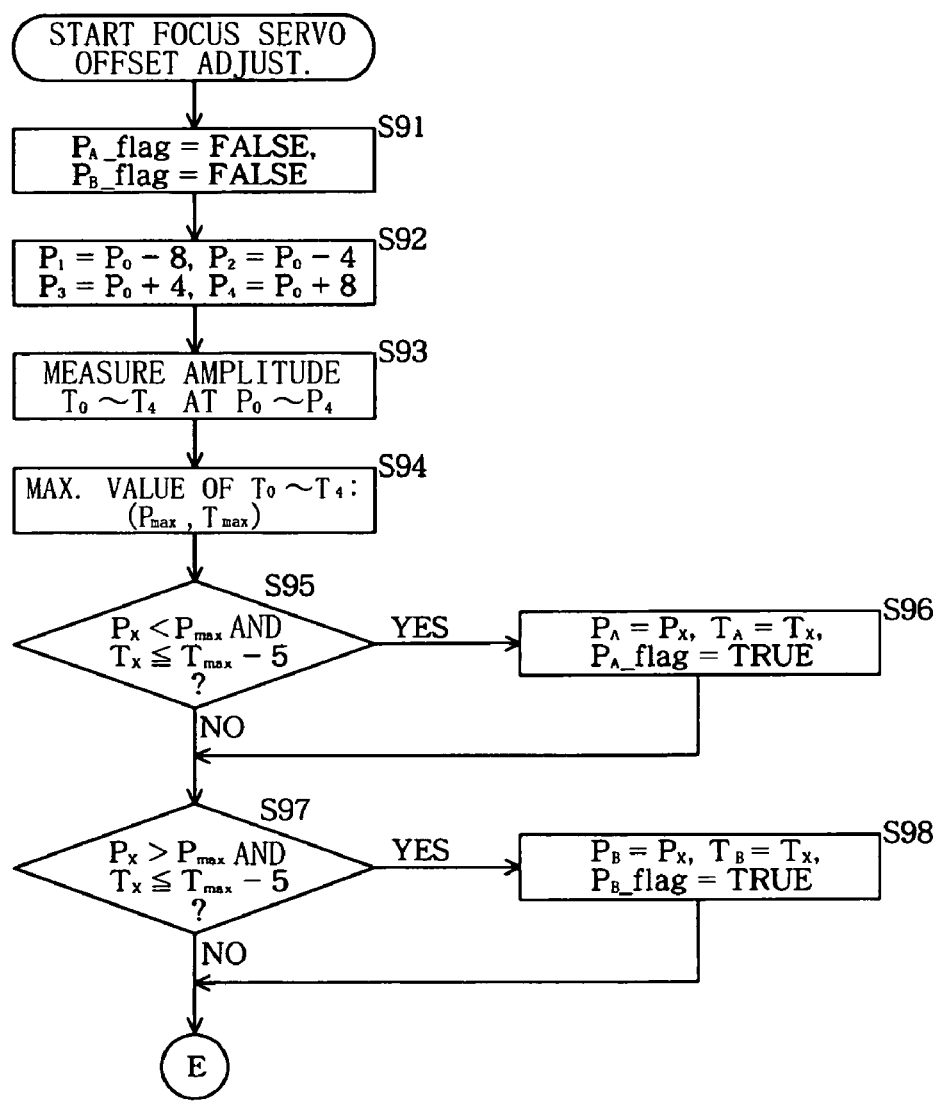
FIG. 13 is a flow chart showing a first part of a specific procedure of focus offset adjustment processing to be executed when a conventional disk recording-playback device is initiated into operation.
Figure 14:
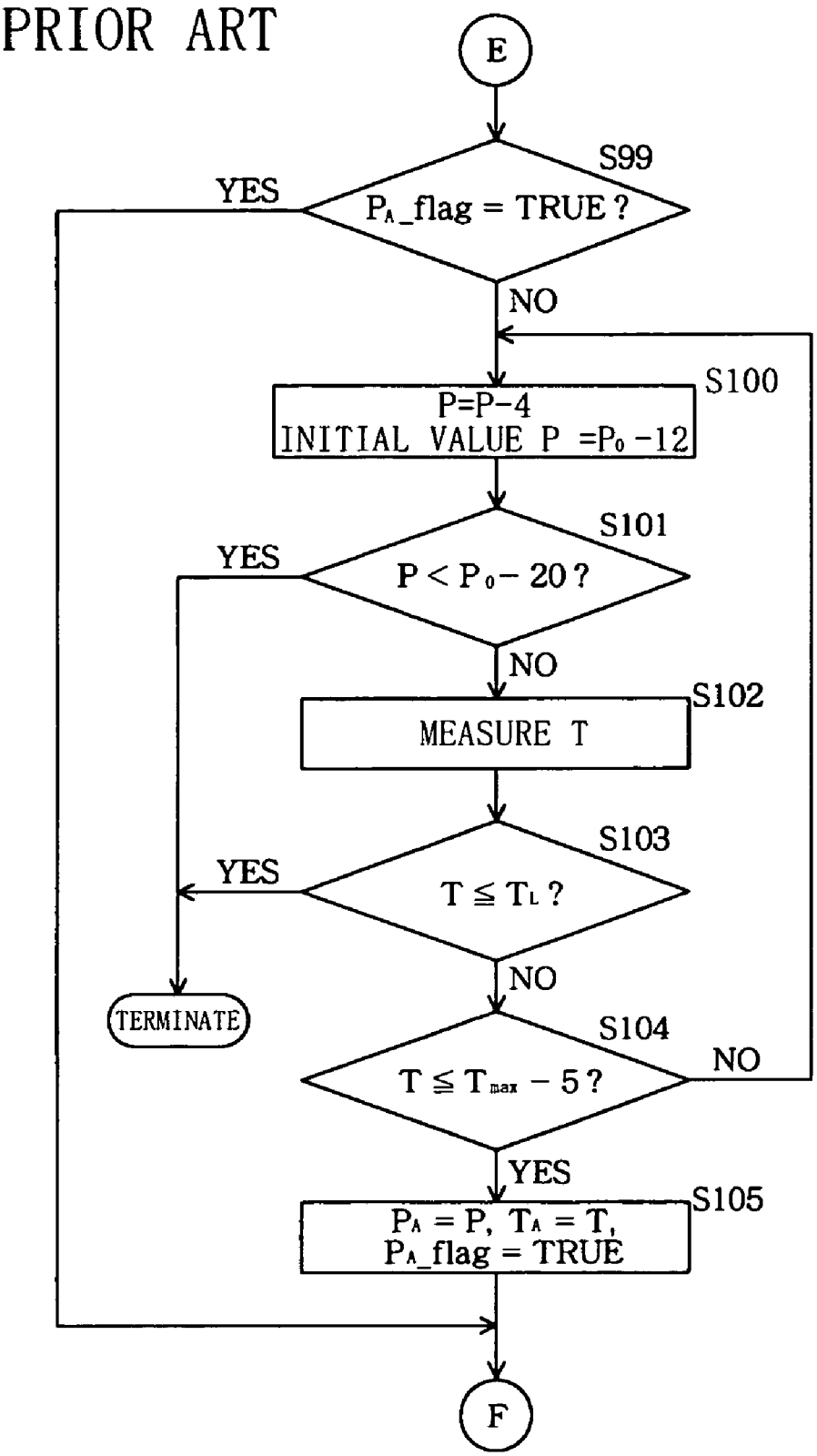
FIG. 14 is a flow chart showing a second part of the procedure.
Figure 15:
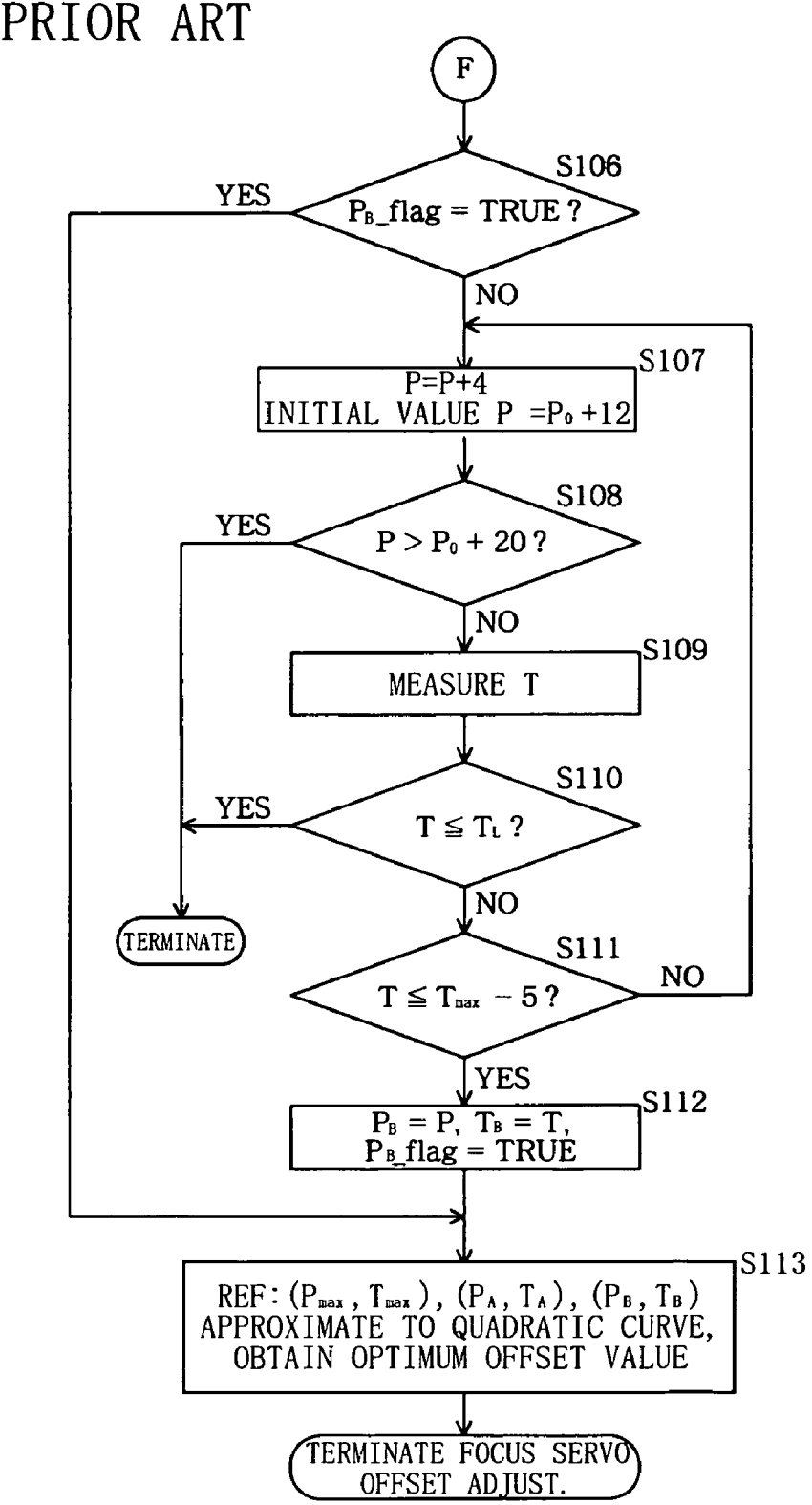
FIG. 15 is a flow chart showing a third part of the procedure.
Figure 16:
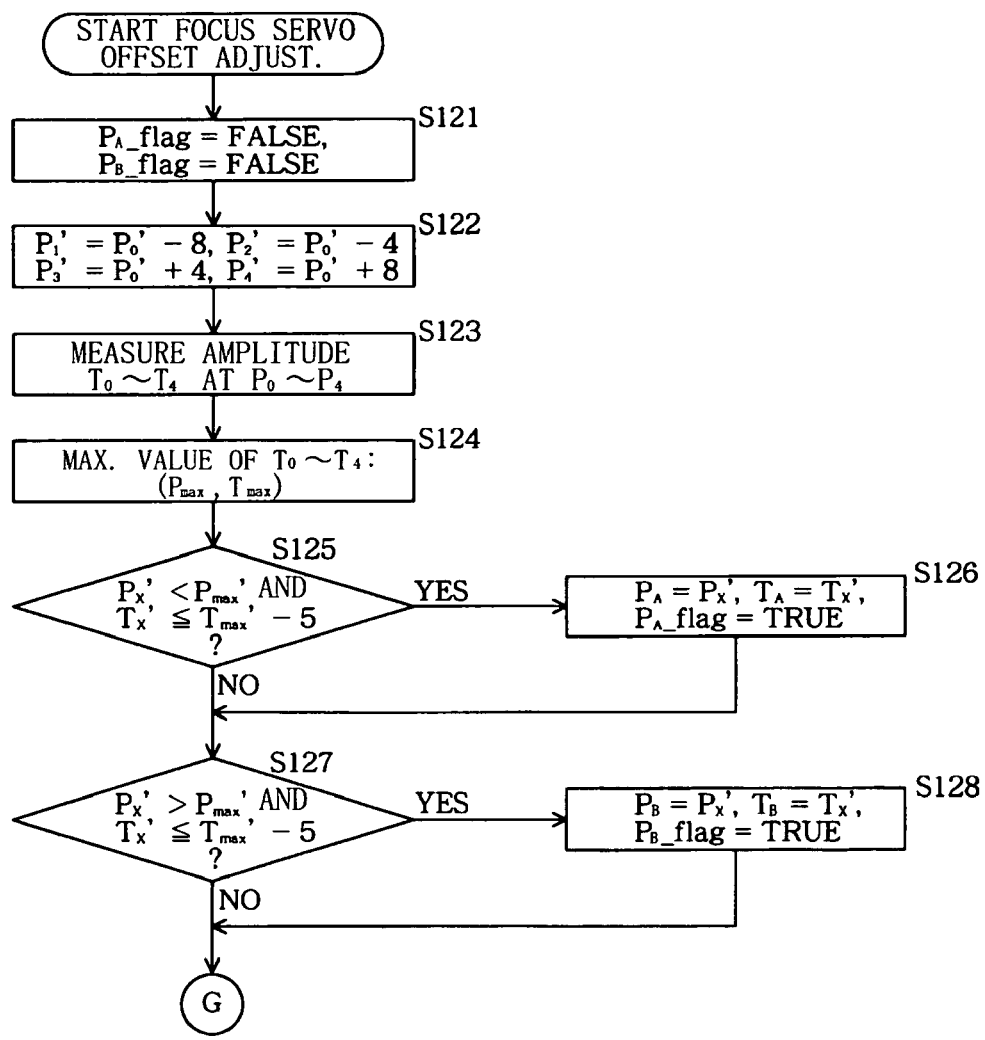
FIG. 16 is a flow chart showing a first part of a specific procedure of focus offset adjustment processing to be executed when the disk recording-playback device is in a usual operation.
Figure 17:
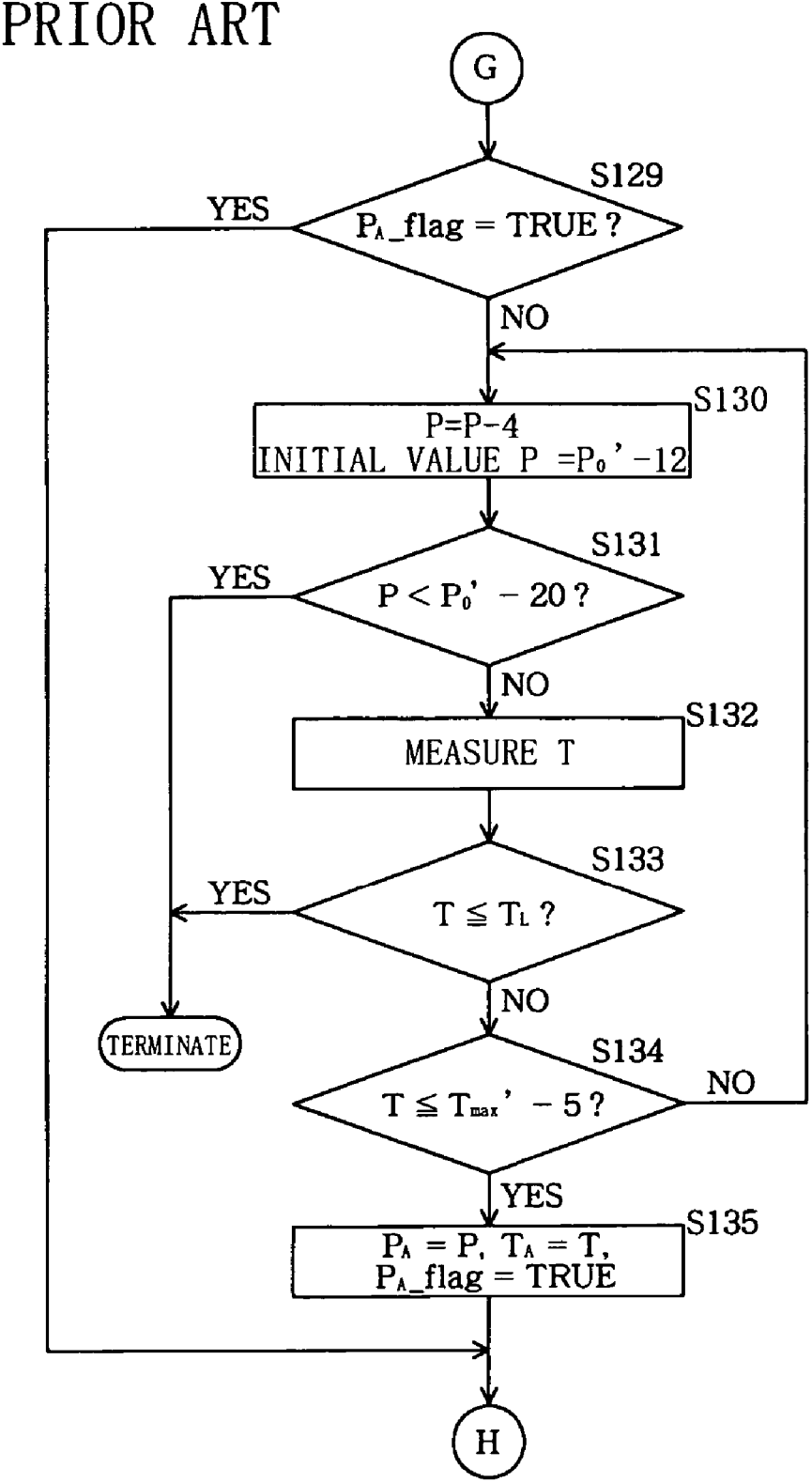
FIG. 17 is a flow chart showing a second part of the procedure.
Figure 18:
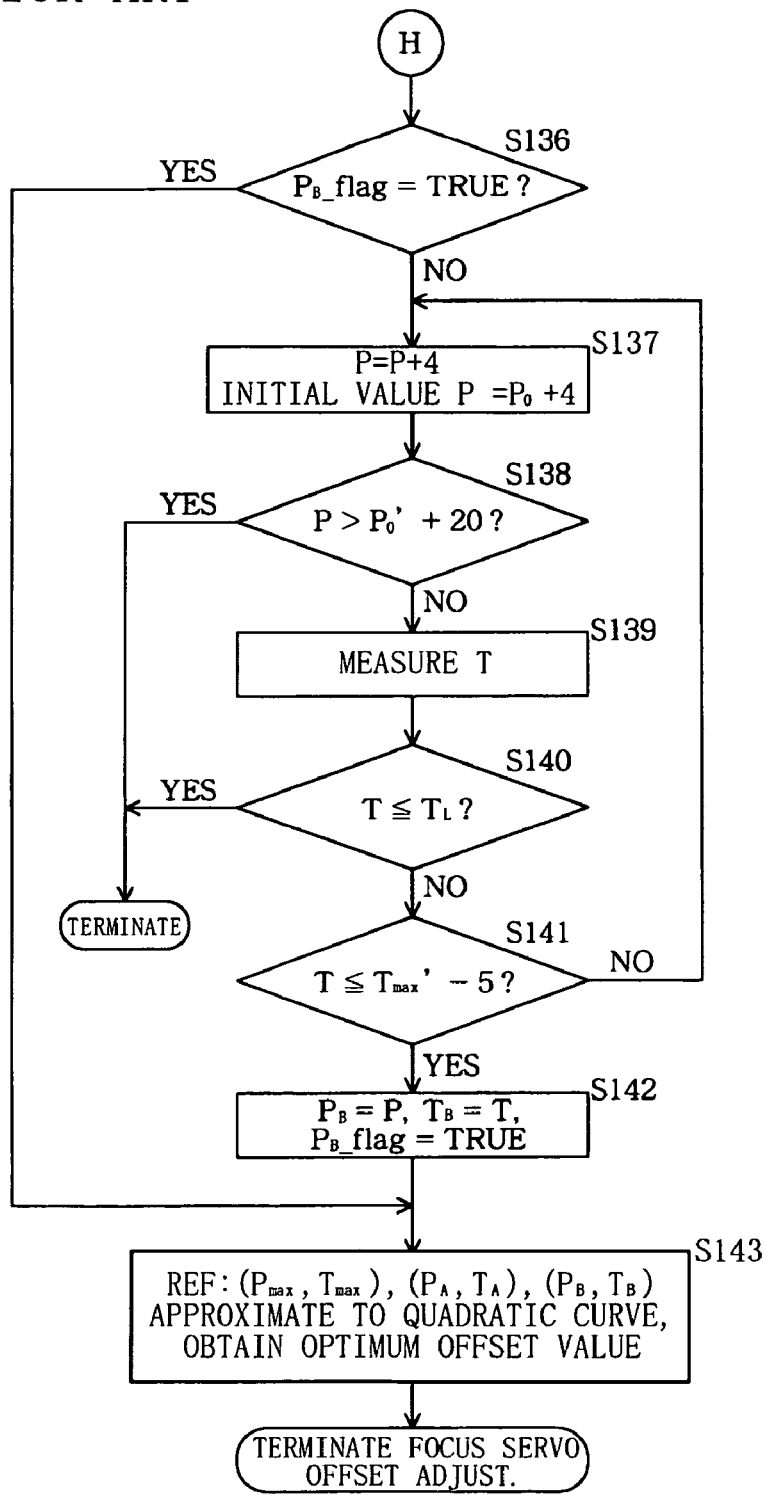
FIG. 18 is a flow chart showing a third part of the procedure.
Figure 19:
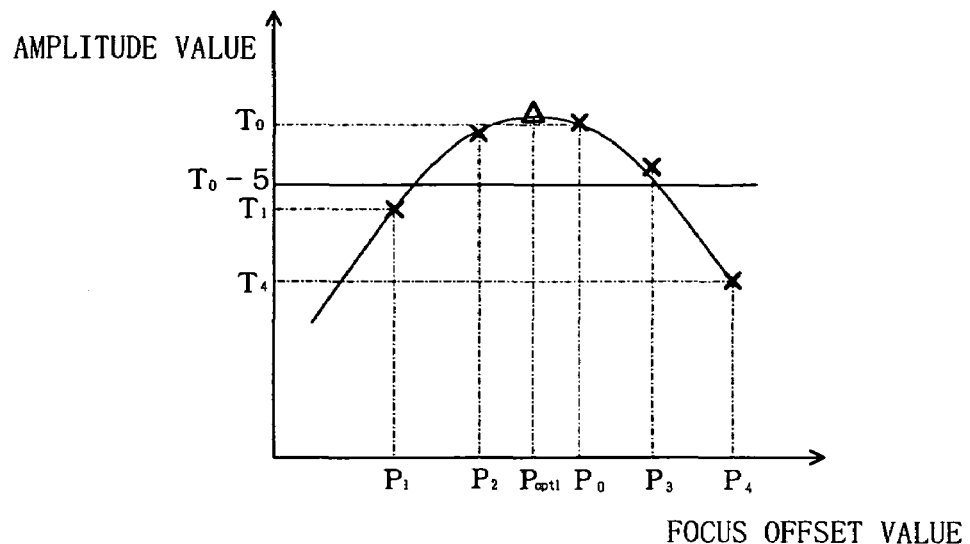
FIG. 19 is a graph illustrating a procedure of focus offset adjustment processing to be executed when the device is initiated into operation.
Figure 20:
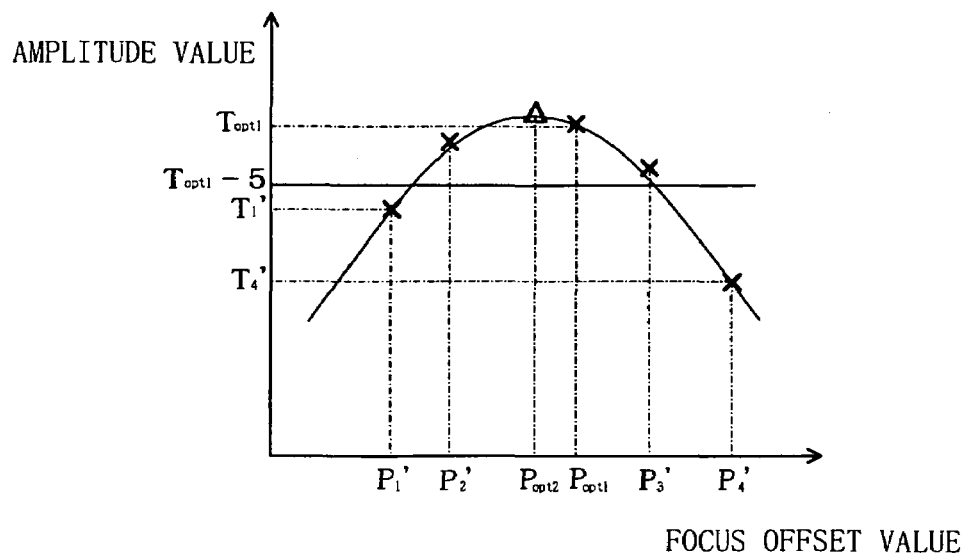
FIG. 20 is a graph illustrating a procedure of focus offset adjustment processing to be executed when the device is in the usual operation.

FIGS. 3 to 5 show a specific procedure of the offset adjustment processing to be executed in step S2 described. A procedure of step S21 in FIG. 3 to step S43 in FIG. 5 is the same as the conventional procedure shown in FIGS. 13 to 15. In the case where the second point and the third point are included in four measured points other than the first point from among the five points measured, with reference to data on the first to third points $(P_{max}, T_{max})$, $(P_A, T_A)$ and $(P_B, T_B)$ which are included in the five points measured, the relationship between the offset values and the amplitude values is approximated to a quadratic curve, calculating an offset value corresponding to the peak of the quadratic curve as an optimum offset value $P_{opt}$ in step S43 in FIG. 5.

On the other hand, when the second point is not included in the four measured points other than the first point, the second point is retrieved in steps S30 to S35 in FIG. 4. Data on the second point $(P_A, T_A)$ retrieved is used when the relationship between the offset values and the amplitude values is approximated to a quadratic curve in step S43 in FIG. 5.

Furthermore, when the third point is not included in the four measured points other than the first point, the third point is retrieved in steps S37 to S42 in FIG. 5. Data on the third point $(P_B, T_B)$ retrieved is used when the relationship between the offset values and the amplitude values is approximated to a quadratic curve in step S43.

In step S43 the optimum offset value is determined as described, thereafter followed by step S44 wherein the offset value $P_A$ at the second point and the offset value $P_B$ at the third point are stored in a built-in memory, to terminate the procedure.

Accordingly, the optimum offset value $P_{opt}$ for the focus error is determined based on the TE signal, and the focus offset adjustment is made with reference to the optimum offset value $P_{opt}$. Further, in the offset adjustment processing to be executed in step S6 in FIG. 2, which is the same as the processing shown in FIGS. 3 to 5, an optimum offset value for the focus error is determined based on the RF signal, and a focus offset adjustment is made based on the optimum offset value.

With the disk recording-playback device described, the focus offset adjustment is made based on the TE signal, as described, while the focus offset adjustment is made based on the RF signal, and signal reproduction and signal recording are thereafter started.

Figure 6:
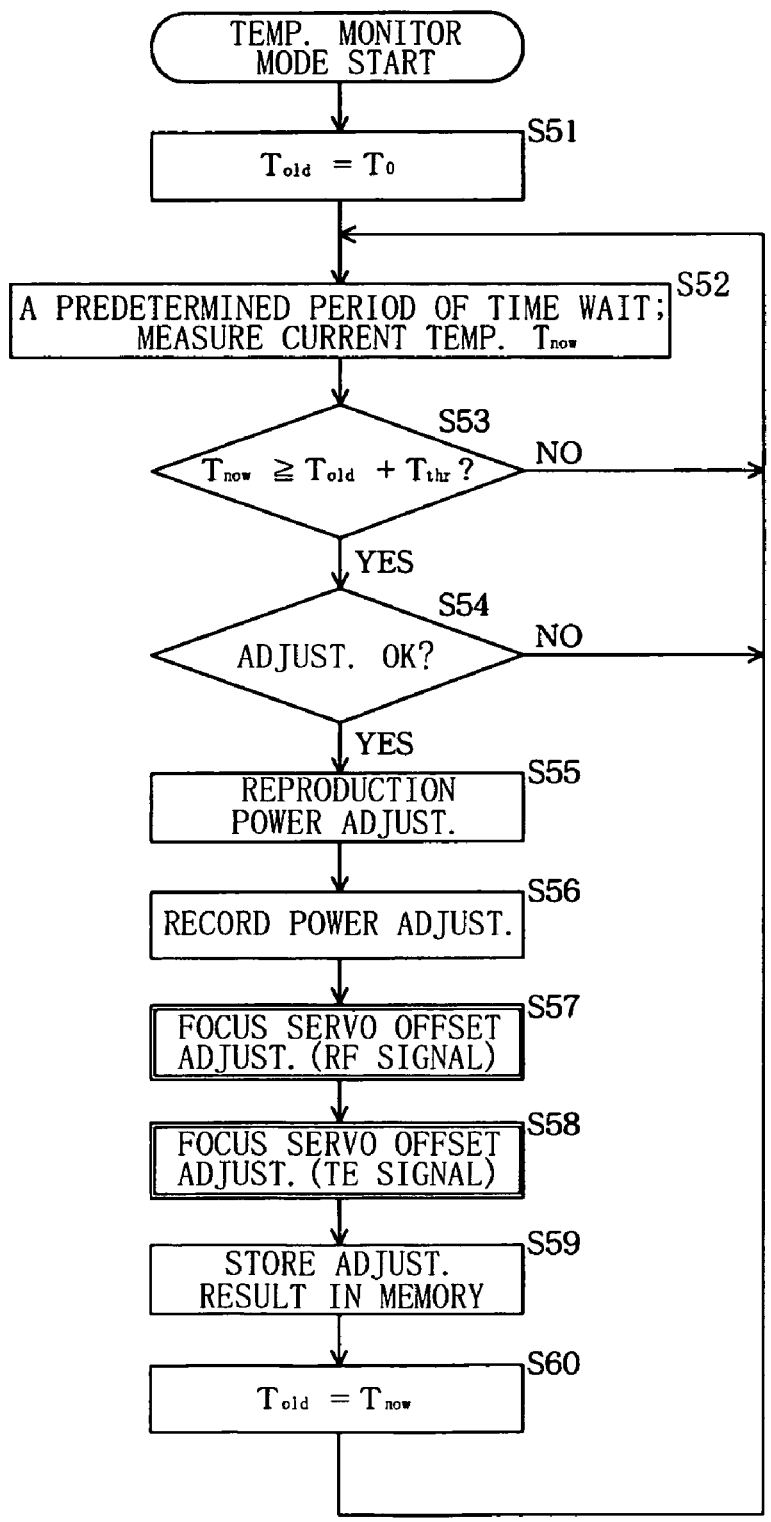
FIG. 6 is a flow chart showing a procedure to be executed when the disk recording-playback device is in a usual operation.

FIG. 6 shows a procedure to be executed by the control circuit 7 in a usual operation for signal reproduction and signal recording after the system's initiation into operation. When the usual operation is started, first in step S51 a past disk temperature $T_{old}$ is set at a temperature $T_0$ stored in the built-in memory in the initiation into operation of the device as described. In step S52 after the elapse of a predetermined period of time, a current disk temperature $T_{now}$ is measured.

Subsequently in step S53 an inquiry is made as to whether the current disk temperature $T_{now}$ is not less than a temperature $(T_{old}+T_{thr})$ obtained by adding the past disk temperature $T_{old}$ to a predetermined temperature $T_{thr}$. When the answer is negative, the sequence returns to step S52 to repeat the same procedure. Here, the predetermined temperature $T_{thr}$ is set at 5° C., for example.

When variations of the disk temperature in excess of or equal to the predetermined temperature $T_{thr}$ make the answer for step S53 affirmative, the sequence proceeds to step S54 wherein an inquiry is made as to whether the device is set capable of adjusting various parameters in accordance with temperature variations of the disk. When the answer for step S54 is negative, the sequence returns to step S52. On the other hand, when the answer is affirmative, step S55 follows to adjust the reproduction power, and thereafter in step S56 the recording power is adjusted.

Then in step S57 the focus offset value is adjusted based on the RF signal, and thereafter in step S58 the focus offset value is adjusted based on the TE signal. Lastly in step S59 current values of parameters adjusted as described are stored in the built-in memory, and thereafter in step S60 the past disk temperature $T_{old}$ is set at the current disk temperature $T_{now}$. Then the sequence returns to step S52. According to the procedure described, every time variations in temperature of the disk in excess of or equal to a predetermined temperature occur, the focus offset adjustment processing is repeated.

In the previous offset adjustment processing, for example, as seen in FIG. 10, the second and third offset values $P_1$, $P_4$ each has an amplitude value smaller than the amplitude value $T_0$ at the first offset value $P_0$ by a predetermined value or more. Further, the optimum offset value $P_{opt1}$ has an amplitude value greater than the amplitude value $T_0$ at the first offset value $P_0$. Thus the second and third offset values $P_1$, $P_4$ each has an amplitude value smaller than an amplitude value $T_{opt1}$ at the optimum offset value $P_{opt1}$ by a predetermined value or more.

Furthermore, when the disk recording-playback device is in the usual reproduction operation, there is little change in the quadratic curve representing the relationship between the offset values and the amplitude values. Accordingly, also in the current offset adjustment processing, amplitude values $T_1$, $T_4$ at the second and third offset values $P_1$, $P_4$ obtained in the previous offset adjustment processing have a very high possibility of being smaller than the amplitude value $T_{opt1}$ at the previous optimum offset value $P_{opt1}$ by a predetermined value or more, as seen in FIG. 11.

Figure 11:
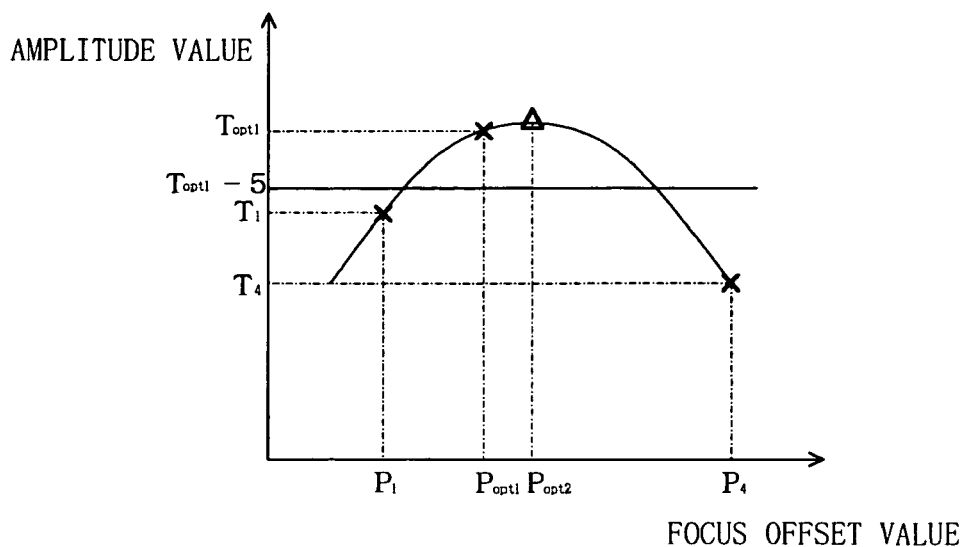
FIG. 11 is a graph illustrating a procedure of offset adjustment processing to be executed when the device is in the usual operation.
Figure 12:
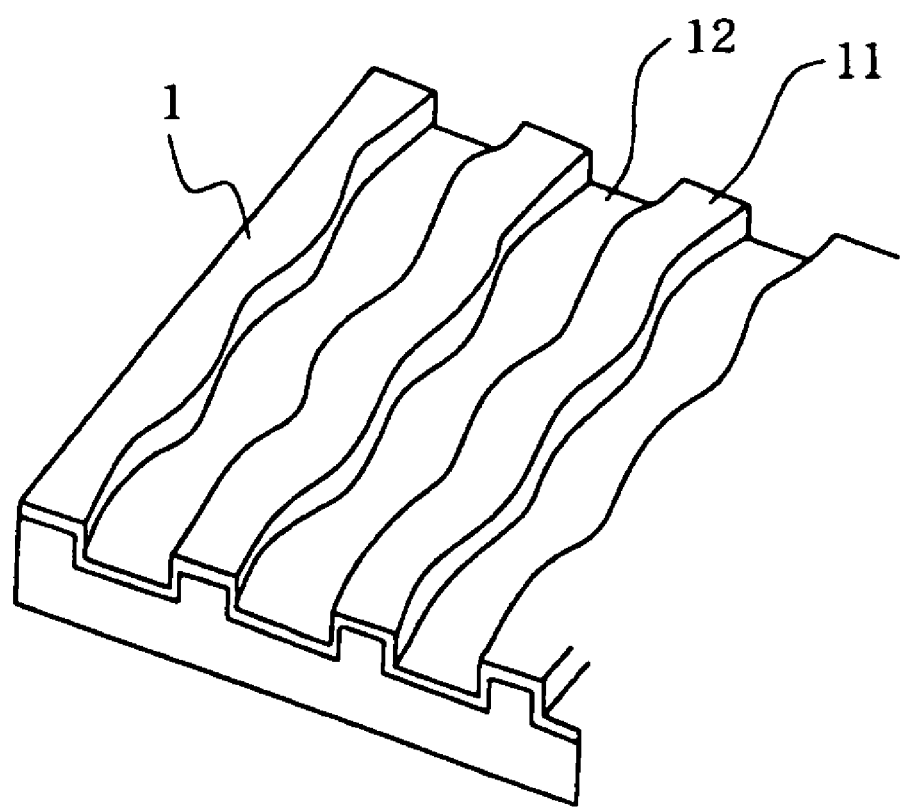
FIG. 12 is an enlarged perspective view showing lands and grooves formed on a magneto-optical disk.

In the focus offset adjustment processing in step S57 and step S58 shown in FIG. 6, focus offset values are respectively set at the optimum offset value $P_{opt1}$ determined in the previous offset adjustment processing, i.e., the previous second offset value $P_1$ and the previous third offset value $P_4$, as seen in FIG. 11, and amplitude values at the respective offset values for the TE signal or the RF signal are measured. When the second offset value $P_1$ and the third offset value $P_4$ each has an amplitude value not greater than a value ($T_{opt1}-5$) obtained by subtracting a predetermined value from the amplitude value $T_{opt1}$ at the optimum offset value $P_{opt1}$, a quadratic curve representing the relationship between the offset values and the amplitude values is determined with reference to the offset values $P_{opt1}$, $P_1$, $P_4$ and the amplitude values $T_{opt1}$, $T_1$, $T_4$ at the respective three measured point. An offset value corresponding to the peak of the quadratic curve is determined as an optimum offset value $P_{opt2}$.

Figure 7:
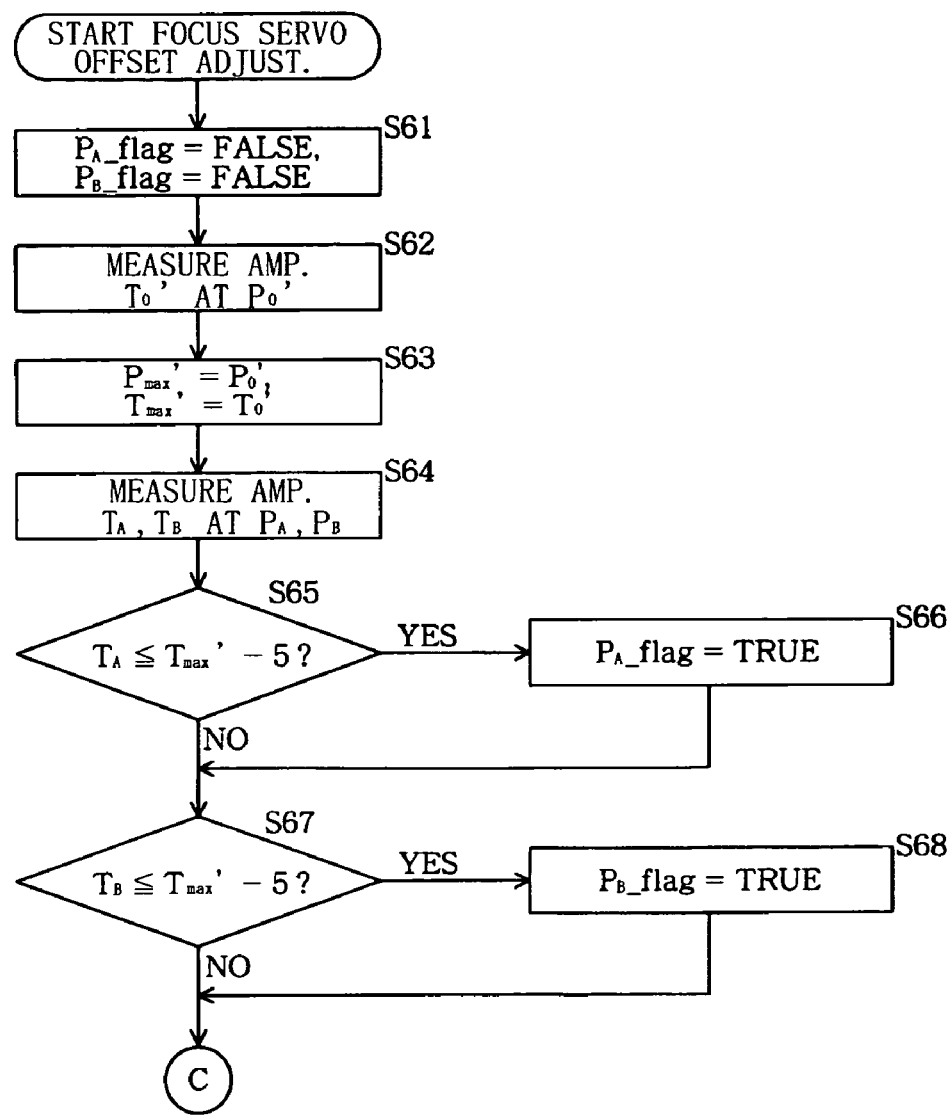
FIG. 7 is a flow chart showing a first part of a specific procedure of focus offset adjustment processing to be executed when the device is in the usual operation.
Figure 8:
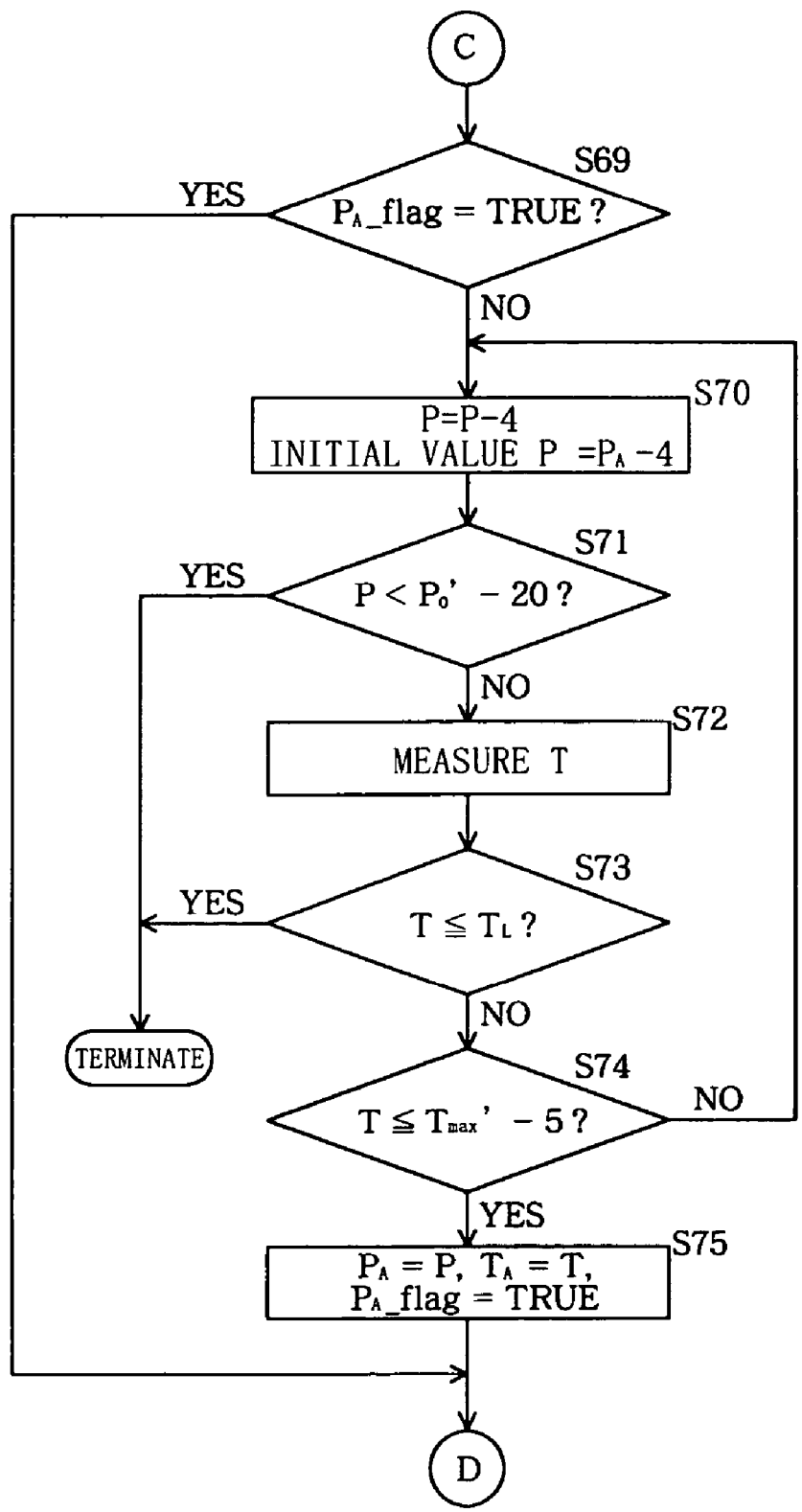
FIG. 8 is a flow chart showing a second part of the procedure.
Figure 9:
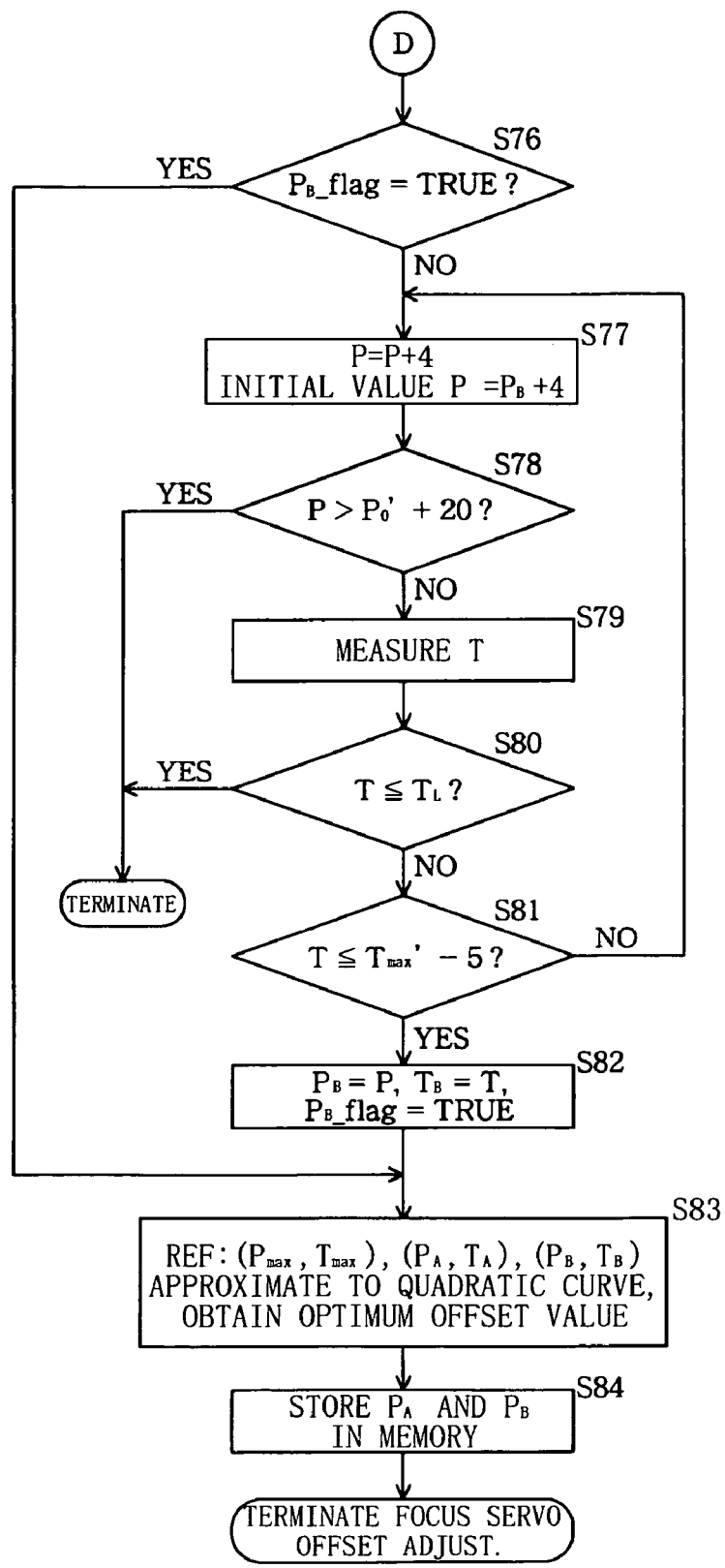
FIG. 9 is a flow chart showing a third part of the procedure.

FIGS. 7 to 9 show a specific procedure of the focus offset adjustment processing to be executed in step S57 described. First in step S61 in FIG. 7, set to "FALSE" are a $P_A\_$flag and a $P_B\_$flag indicating whether the second and third offset values $P_A$, $P_B$ are each obtained. In step S62, a focus offset value is set at a set value $P_0'$ concerned, i.e., the previous optimum offset value, and an amplitude value $T_0'$ for an RF signal is measured.

Subsequently in step S63, a first offset value $P_{max}'$ is set at the set value $P_0'$, and a first amplitude value $T_{max}'$ is set at the measured amplitude value $T_0'$. In step S64, offset values are respectively set at the two values $P_A$, $P_B$ stored in the built-in memory, i.e., the second offset and the third offset value used when the quadratic curve is determined in the previous offset adjustment processing, and amplitude values $T_A$, $T_B$ at the respective offset values are measured.

Next in step S65, an inquiry is made as to whether the measured amplitude value $T_A$ is smaller than the first amplitude value $T_{max}'$ by five steps or more. If the inquiry is answered in the affirmative, step S66 follows to set to "TRUE" the $P_A\_$flag indicating whether the second offset value is obtained, and thereafter followed by step S67.

In step S67, an inquiry is made as to whether the measured amplitude value $T_B$ is smaller than the first amplitude value $T_{max}'$ by five steps or more. If the inquiry is answered in the affirmative, step S68 follows to set to "TRUE" the $P_B\_$flag indicating whether the third offset value is obtained, and thereafter followed by step S69 in FIG. 8.

When the amplitude values $T_A$, $T_B$ at the previous second offset value $P_A$ and the third offset value $P_B$ are both smaller than the first amplitude value $T_{max}'$ by five steps or more, inquiries in step S69 in FIG. 8 and in step S76 in FIG. 9 are answered in the affirmative. Then step S83 follows wherein the relationship between the offset values and the amplitude values is approximated to a quadratic curve with reference to the data on the three measured points ($P_{max}'$, $T_{max}'$), ($P_A$, $T_A$) and ($P_B$, $T_B$), and an offset value corresponding to the peak of the quadratic curve is calculated to be an optimum offset value $P_{opt}$. Lastly in step S84, the second offset value $P_A$ and the third offset value $P_B$ are stored in the built-in memory, to terminate the procedure. Accordingly, a new optimum offset value $P_{opt}$ is obtained with reference to the optimum offset value and the second and third offset values which are obtained in the previous offset adjustment processing, and the amplitude values at the respective offset values.

On the other hand, when the amplitude value $T_A$ at the previous second offset value $P_A$ is not smaller than the first amplitude value $T_{max}'$ by five steps or more, an inquiry in step S69 in FIG. 8 is answered in the negative. In steps S70 to S75, an offset value is decreased starting from a value smaller than the offset value $P_A$ by four steps, to thereby vary the offset value until when an amplitude value T becomes a value smaller than the first amplitude value $T_{max}'$ by five steps or more. Then a second offset value $P_A$ and a second amplitude value $T_A$ are respectively set at the offset value and the amplitude value concerned. The second point is thus retrieved. Thereafter in step S83 in FIG. 9, when the relationship between the offset values and the amplitude values is approximated to a quadratic curve, the retrieved data ($P_A$, $T_A$) on the second point is referred to. However, when an offset value becomes a value smaller than the previous optimum offset value by 20 steps or more to make the answer in step S71 affirmative, and when an amplitude value T is not greater than a lower limit value $T_L$ to make the answer in step S73 affirmative, focus servo deviates, to thereby terminate the procedure.

Furthermore, when the amplitude value $T_B$ at the previous third offset value $P_B$ is not smaller than the first amplitude value $T_{max}'$ by five steps or more, an inquiry in step S76 in FIG. 9 is answered in the negative. In steps S77 to S82, an offset value is increased starting from a value greater than the offset value $P_B$ by four steps, to thereby vary the offset value until when the amplitude value T becomes a value smaller than the first amplitude value $T_{max}'$ by five steps or more. Then a third offset value $P_B$ and a third amplitude value $T_B$ are respectively set at the offset value and the amplitude value concerned. The third point is thus retrieved. Thereafter in step S83, when the relationship between the offset values and the amplitude values is approximated to a quadratic curve, the retrieved data ($P_B$, $T_B$) on the third point is referred to. However, when an offset value becomes a value greater than the previous optimum offset value by 20 steps or more to make the answer in step S78 affirmative, and when an amplitude value is not greater than a lower limit value $T_L$ to make the answer in step S80 affirmative, focus servo deviates, to thereby terminate the procedure.

Accordingly, the optimum offset value $P_{opt}$ for the focus error is obtained based on the RF signals, to thereby make a focus offset adjustment based on the optimum offset value. Furthermore, in the offset adjustment processing to be executed in step S58 in FIG. 6, the optimum offset value for the focus error is obtained based on the TF signals according to the same procedure as that in FIGS. 7 to 9, to thereby make a focus offset adjustment based on the offset value. Consequently, focus servo is effected with high accuracy at all times despite variations in temperature of the magneto-optical disk.

In the focus offset adjustment processing to be executed in the usual operation of the disk recording-playback device embodying the present invention, the amplitude values each at the previous offset value $P_{opt1}$, the previous second offset value $P_1$, and the previous third offset value $P_4$ is measured, as seen in FIG. 11. When the amplitude values at the second and third offset values $P_1$, $P_4$ are both smaller than the amplitude value at the optimum offset value $P_{opt1}$ by five steps or more, the quadratic curve representing the relationship between the offset values and the amplitude values is determined with reference to the offset values and the amplitude values at the three measured points. This makes a period of time required for the determination of the quadratic curve shorter than conventionally, because, with the conventional disk recording-playback device, the amplitude values need be measured at at least five points. Consequently, a period of time taken for deriving the optimum offset value is reduced.

Furthermore, when the amplitude value at the previous second offset value fails to be a value smaller than the amplitude value at the previous optimum offset value by five steps or more, a new offset value is retrieved wherein an amplitude value is a value smaller than the amplitude value at the previous optimum offset value by five steps or more, as shown in FIG. 8. Further, when the amplitude value at the previous third offset value fails to be a value smaller than the amplitude value at the previous optimum offset value by five steps or more, a new offset value is retrieved wherein an amplitude value is a value smaller than the amplitude value at the previous optimum offset value by five steps or more, as shown in FIG. 9. Thereafter, a quadratic curve is determined with reference to the offset value thus retrieved. Accordingly, the quadratic curve is determined with high accuracy constantly, to thereby obtain the optimum offset value with high accuracy at all times.

The present invention is not limited to the foregoing embodiment in construction but can be modified variously within the technical scope defined in the appended claims.

For example, in the usual operation, tracking offset adjustment processing can be performed. In this case the optimum offset value can be obtained in accordance with the procedure shown in FIG. 11.

The invention claimed is:

1. A disk playback device comprising a calculation processing circuit for determining an optimum value of offset for an error signal based on an amplitude value of the error signal in accordance with focus deviation or tracking deviation of an optical head or an amplitude value of an output signal of the optical head, and making an offset adjustment based on the optimum offset value, the calculation processing circuit approximating to a quadratic curve the relationship between offset values and the amplitude values in signal reproduction, and repeating calculation of the optimum offset values based on the quadratic curve, and comprising:

calculation processing means for approximating to a quadratic curve the relationship between the offset values and the amplitude values with reference to three different offset values and three amplitude values at the respective offset values, and calculating an offset value corresponding to the peak of the quadratic curve as the optimum offset value, and value setting means for setting the three different offset values: a first offset value; a second offset value smaller than the first offset value and having an amplitude value smaller than an amplitude value at the first offset value by a predetermined value or more; a third offset value greater than the first offset value and having an amplitude value smaller than an amplitude value at the first offset value by a predetermined value or more, and setting the three amplitude values respectively at three amplitude values at the first to third offset values, the value setting means setting the first offset value at an optimum offset value obtained in a previous optimum offset value calculation processing, and setting the second and third offset values respectively at second and third offset values set in a previous optimum offset value calculation processing, wherein a maximum of three amplitude values of a maximum of three different offset values need to be measured to determine the optimum offset value and the determination of said second and said third offset values does not require the determination of amplitude values of at least five different offset values.

2. A disk playback device according to claim 1, wherein the calculation processing circuit comprises:

first checking means for checking whether an amplitude value at the previous second offset value is smaller than an amplitude value at the previous optimum offset value by a predetermined value or more, second checking means for checking whether an amplitude value at the previous third offset value is smaller than an amplitude value at the previous optimum offset value by a predetermined value or more, the value setting means comprising:

second offset value setting means for retrieving an offset value having an amplitude value smaller than the amplitude value at the previous optimum offset value by a predetermined value or more when the amplitude value at the previous second offset value is not found to be smaller than the amplitude value at the previous optimum offset value by a predetermined value or more, and setting a second offset value at the retrieved offset value, and third offset value setting means for retrieving an offset value having an amplitude value smaller than the amplitude value at the previous optimum offset value by a predetermined value or more when the amplitude value at the previous third offset value is not found to be smaller than the amplitude value at the previous optimum offset value by a predetermined value or more, and setting a third offset value at the retrieved offset value.

3. A disk playback device according to claim 1 or claim 2 wherein the disk playback device comprises temperature detection means for detecting a temperature of the disk, and the calculation processing circuit calculates the optimum offset value every time the disk is varied in temperature by a predetermined temperature value.

* * * * *

UNITED STATES PATENT AND TRADEMARK OFFICE
CERTIFICATE OF CORRECTION

PATENT NO. : 7,376,054 B2  
APPLICATION NO. : 10/523519  
DATED : May 20, 2008  
INVENTOR(S) : Takako Araki Page 1 of 1

It is certified that error appears in the above-identified patent and that said Letters Patent is hereby corrected as shown below:

On the Title page:

Item "(54)" "DISC REPRODUCTION DEVICE"

should read:

Item "(54)" --DISK PLAYBACK DEVICE--

Column 1, line 1, the title should read: --DISK PLAYBACK DEVICE--.

Signed and Sealed this

Nineteenth Day of August, 2008

JON W. DUDAS  
*Director of the United States Patent and Trademark Office*